US009067731B1

(12) United States Patent
Jackson

(10) Patent No.: US 9,067,731 B1
(45) Date of Patent: Jun. 30, 2015

(54) LID LIFTING DEVICE

(71) Applicant: Original Design Products, LLC, Agoura Hills, CA (US)

(72) Inventor: Michael Jackson, Agoura Hills, CA (US)

(73) Assignee: Original Design Products, LLC, Agoura Hills, CA (US)

( * ) Notice: Subject to any disclaimer, the term of this patent is extended or adjusted under 35 U.S.C. 154(b) by 0 days.

(21) Appl. No.: 13/921,367

(22) Filed: Jun. 19, 2013

(51) Int. Cl.

| | |
|---|---|
| ***A47B 96/06*** | (2006.01) |
| ***A47G 29/18*** | (2006.01) |
| ***A47K 1/00*** | (2006.01) |
| ***A47K 5/00*** | (2006.01) |
| ***B65F 1/14*** | (2006.01) |
| ***B23P 19/00*** | (2006.01) |

(52) U.S. Cl.
CPC ............... *B65F 1/1623* (2013.01); *B23P 19/00* (2013.01)

(58) Field of Classification Search
CPC ........... B65F 1/16; B65F 1/1623; B23P 19/00
USPC ................................ 292/262; 52/19; 248/351
See application file for complete search history.

(56) References Cited

U.S. PATENT DOCUMENTS

| | | | | |
|---|---|---|---|---|
| 6,138,855 | A * | 10/2000 | Kopf | 220/263 |
| 6,347,818 | B1 * | 2/2002 | Lyons, Sr. | 292/271 |
| 6,672,020 | B1 * | 1/2004 | Cermola et al. | 52/200 |
| 2009/0199490 | A1 * | 8/2009 | Hockham | 52/20 |

* cited by examiner

*Primary Examiner* — Amy Sterling
(74) *Attorney, Agent, or Firm* — Sandy Lipkin

(57) ABSTRACT

An apparatus and method for easily and simply lifting and holding upon a heavy cumbersome lids, such as those found on large trash containers thereby allowing the user the use of both hands for hoisting and dumping the trash without having to hold open the lid with one hand or other body part. Furthermore, the use of an external device to lift and hold open the lid makes it easier to keep the task hygienic.

1 Claim, 3 Drawing Sheets

LID LIFTING DEVICE

BACKGROUND OF THE INVENTION

1. Field of the Invention

The field of this invention is devices for assistance in keeping a lid open and more particularly toward a handle to be attached to primarily large trash containers that can open the large, cumbersome and sometimes heavy lid and keep it open thereby allowing the person putting trash therein to maintain the use of both hands.

2. Description of the Prior Art

Large trash containers are common in commercial areas and large residential areas, such as apartment buildings. These large trash containers contain large, bulky and somewhat heavy lids. The lids are routinely kept shut in order to keep the large volume of trash secured therein and to keep the ambient area free from odors and debris.

When taking a bag or can of garbage out to a large trash container the user typically must open the lid and hold it open so that trash can be placed therein. When a person of modest strength must perform this task, especially with a heavy container of garbage, it can be quite a challenge to keep the lid open on the one and hand and heave the garbage into the container on the other hand. Indeed, often it is the case the person employs some unpleasant gymnastics to perform this task by using their head to keep the lid open while lifting the hoisting the garbage with both hands.

Whether using the head or even one bare hand to keep the lid open, hygiene also becomes an issue as the lid can be contaminated with foul refuse that has been thrown therein. It is the object of the instant invention to provide a simple device and method of keeping the lid open while in use and closing easily thereafter. Furthermore, it is a further object of the instant invention to provide a device that is separate from the lid and that can be more easily kept clean.

SUMMARY OF THE INVENTION

The instant invention defines an apparatus to aid in the lifting a lid to a receptacle and maintaining it in the open position comprising: a main body that is substantially L-shaped having a first arm and a second arm that is substantially perpendicular to said first arm in an X-Y plane; a support bracket for attachment to the perimeter of an open top of a receptacle; a movable nut that connects aid first arm of said main body to said support bracket allows said first arm of said main body to rotate in a radial direction; a supporting piece to support said lid that is attached to said second arm of said main body that is substantially perpendicular to said second arm and extending outward into the Z plane; and a handle attached to said first arm of said main body on the side opposite of said second arm.

A second embodiment teaches a method of lifting a lid to a receptacle and maintaining it in the open position comprising the steps of: attaching an apparatus to the perimeter of the open top of a receptacle, said apparatus further comprising: a main body that is substantially L-shaped having a first arm and a second arm that is substantially perpendicular to said first arm in an X-Y plane; a support bracket for attachment to the perimeter of an open top of a trash receptacle; a movable nut that connects aid first arm of said main body to said support bracket allows said first arm of said main body to rotate in a radial direction; a supporting piece to support said lid that is attached to said second arm of said main body that is substantially perpendicular to said second arm and extending outward into the Z plane; and a handle attached to said first arm of said main body on the side opposite of said second arm; gripping said handle and rotating first arm of said main body in a downward vertical radially direction which in turn causes said second arm to rotate in an upward vertical direction wherein said lid rests on said supporting piece said lid then becoming open and staying open resting upon said supporting arm.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
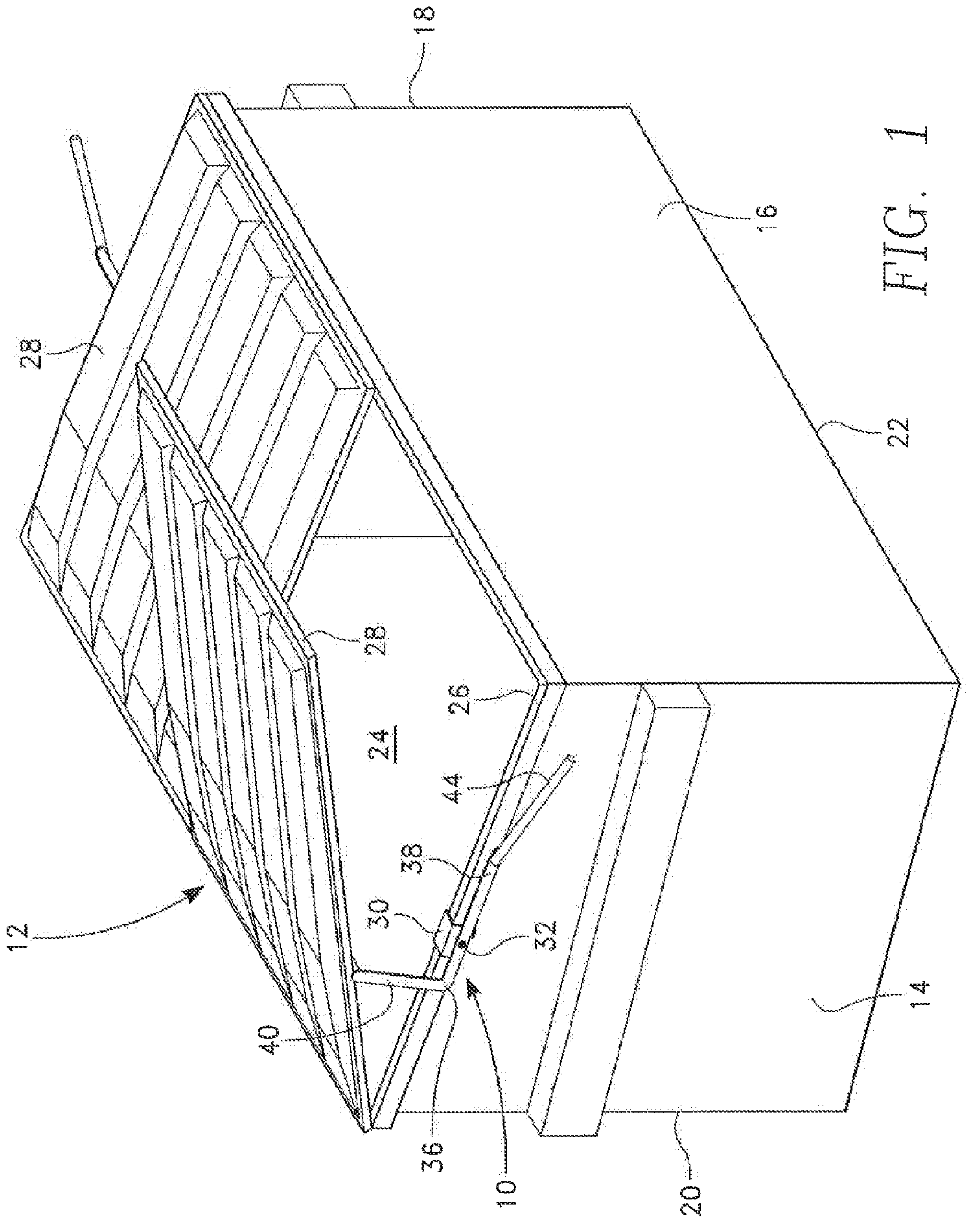
FIG. 1 is a top perspective view of a large trash receptacle with the device of the instant invention installed.
Figure 2:
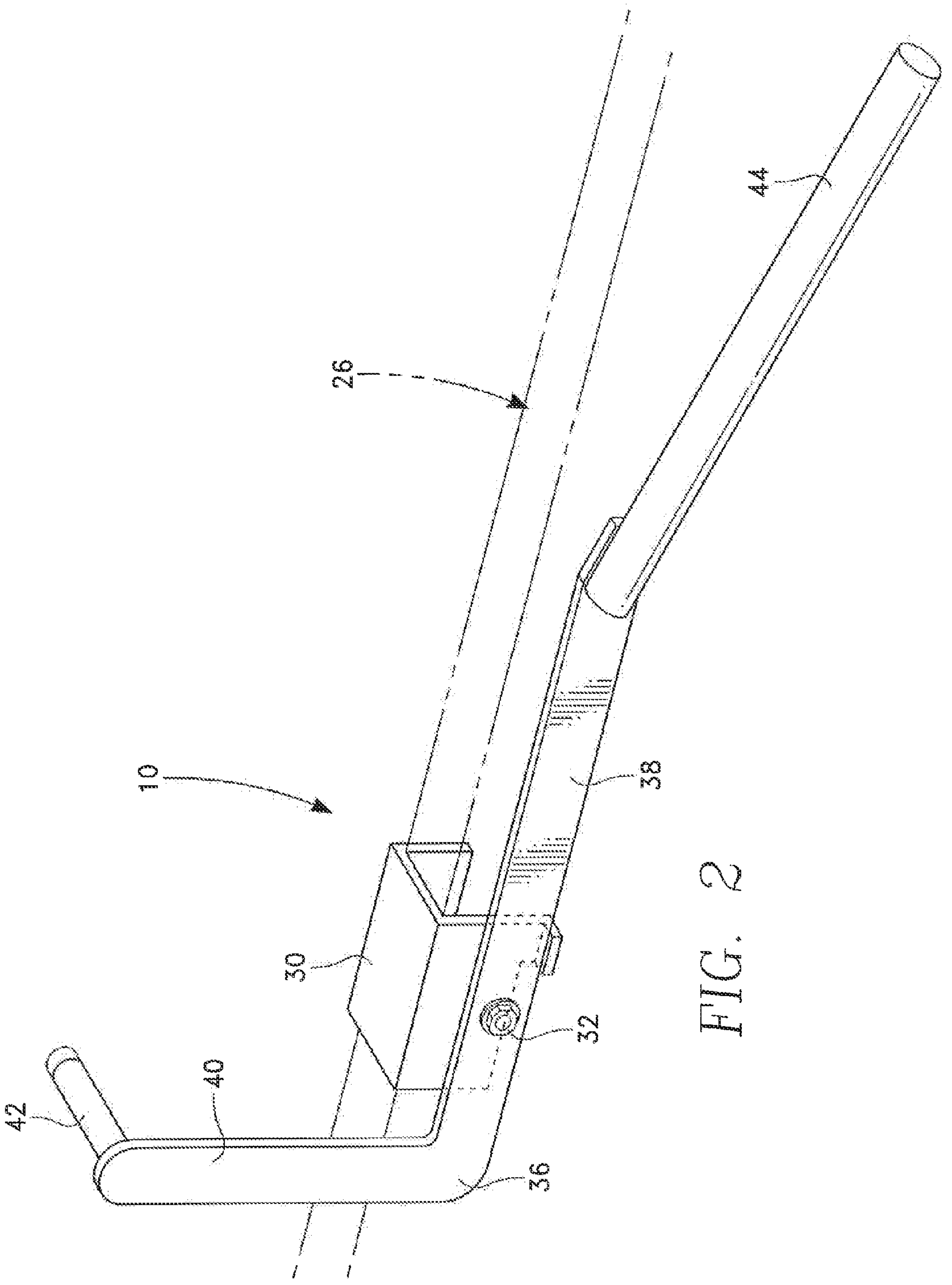
FIG. 2 is a close up side view of the device as it is attached to the side of a large trash receptacle in the open position.

Turning to the drawings, the preferred embodiment is illustrated and described by reference characters that denote similar elements throughout the several views of the instant invention.

The preferred embodiment is an apparatus 10 that is attachable to the side of a large trash receptacle 12. The trash receptacle 12 has four walls 14, 16, 18, 20 and a bottom 22 defining an empty space 24 there between for the placement therein of refuse. The four walls 14, 16, 18, 20 combine to form a substantially rectangular shape with an open top with a perimeter 26. A movable lid 28 is placed over said perimeter 26 for containment of the refuse therein. The lid 28 is typically divided into two halves or more depending on the size of the receptacle 12.

The device 12 of the instant invention is installable on the perimeter 26 on a side 14 of the receptacle 12. The device 10 is attached to a bracket 30 that is secured to the perimeter 26 through a rotatable bolt 32 that allows the device 10 move in a vertical and radial direction 34. The device 10 includes an L-shaped portion 36 with a first arm 38 and a second arm 40 wherein the first arm 38 and second arm are substantially perpendicular to each other in a x-y plane. The second arm 40 has a support bar 42 that extends away from the second arm 40 in a substantially perpendicular direction into the z plane. This support bar 42 provides a resting platform for the lid 28 when the lid 28 is open.

The first arm 38 has attached to it a handle 44 that the user uses to move the lid 28 from the closed to the open position. The handle is the only portion the user need come in physical contact with and can be easily kept clean.

Figure 3:
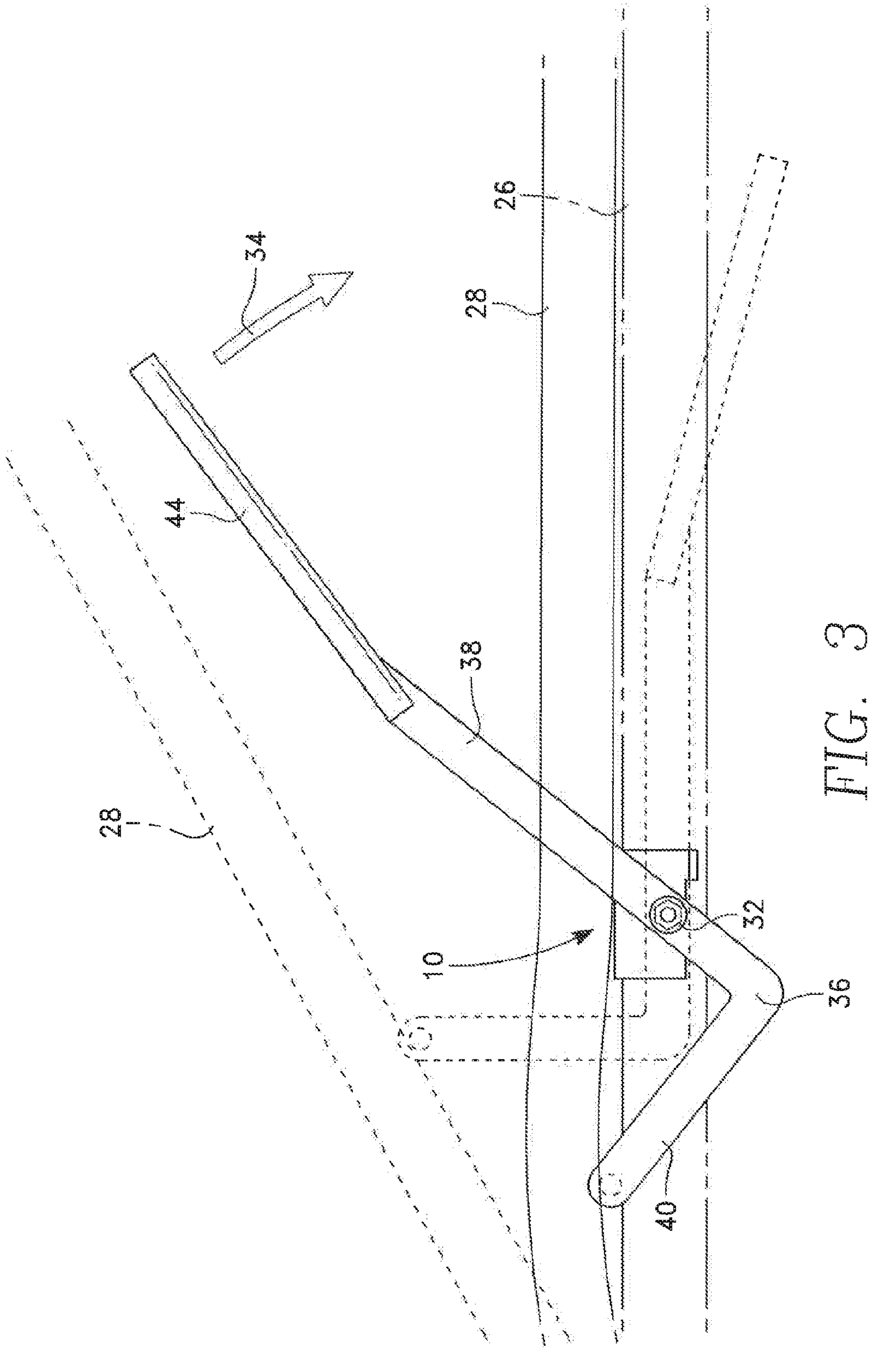
FIG. 3 is a side view of the device as it is attached to the side of a large trash receptacle in the closed position.

The method of using the device 10 after attachment to the perimeter 26 through the bracket 30 is simple. The user approaches the closed trash can receptacle 12. The closed position is shown in FIG. 3. The device 10 is at an angle such that the second arm 40 is substantially flush with the plane of the perimeter 26 and the lid 28 is shut. The handle 44 is suspended slightly into the air. The user grabs a hold of the handle 44 and pulls it downward in a vertically radial direction 34 which causes the L-shaped portion to rotate around the nut 32 thereby causing the second arm 40 and support platform 42 to move in vertically radial direction. The platform 42 being situated under the lid 28, the motion forces the lid 28 upward. Pulled all the way down, the device 10 locks into place and the lid 28 is held open with the need to support with a part of the user's body.

The user then dumps garbage into the open space 24. After this is accomplished, the user then grabs the handle 44 and moves it in a vertically radial direction upward. The platform 42 and second arm 40 move back down and the lid 28 closes securely.

The discussion included in this patent is intended to serve as a basic description. The reader should be aware that the specific discussion may not explicitly describe all embodiments possible and alternatives are implicit.

Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claim is:

1. An apparatus to aid in the lifting a lid of a commercial trash dumpster, said trash dumpster having a closed bottom, a front side, a back side, a right side, a left side and an open top coverable by said lid and maintaining said lid in the open position comprising:

an arm body that is angled in an L-shap having a first arm and a second arm said second arm being substantially perpendicular to said first arm in an X-Y plane;

a single support bracket for attachment to the left or right side of said top of said trash dumpster, said single support bracket being provided for securing said arm body with a fastening bolt and providing a stop for said arm in order to keep said arm from rotating past the top of said commercial trash dumpster;

a movable nut that connects and affixes said first arm of said main body to said single support bracket that allows said first arm of said arm body to rotate in a radial direction to said stop and no further;

a lifting piece to lift and support said commercial dumpster lid, said lifting piece being attached to said second arm of said arm body that is substantially perpendicular to said second arm and extending outward and under said commercial dumpster lid; and a handle attached and angled outward to said second end of said first arm of said arm body on the side opposite of said second arm thereby preventing a user from touching the outer edge of said commercial dumpster when lifting said commercial dumpster lid wherein said handle is accessible when said lid is in the closed position above the top of said commercial trash dumpster.

* * * * *